United States Patent [19]
Correa et al.

[11] Patent Number: 5,517,247
[45] Date of Patent: May 14, 1996

[54] METHOD AND APPARATUS FOR CONVERTING A VIDEO INPUT SIGNAL OF PROGRESSIVE SCAN FORM TO AN INTERLACED VIDEO OUTPUT SIGNAL OF DOUBLED FIELD RATE AND EMPLOYING PROGRESSIVE SCAN TO PROGRESSIVE SCAN INTERPOLATION FOR REDUCTION OF VISUAL ARTIFACTS

[75] Inventors: Carlos Correa; John Stolte, both of Villingen-Schwenningen, Germany

[73] Assignee: Deutsche Thomson-Brandt GmbH, Villingen-Schwenningen, Germany

[21] Appl. No.: 132,148

[22] Filed: Oct. 5, 1993

[30] Foreign Application Priority Data

Oct. 5, 1992 [DE] Germany ............... 42 33 354.7

[51] Int. Cl.⁶ .................................................. H04N 7/01
[52] U.S. Cl. ........................................ 348/448; 348/446
[58] Field of Search ................................. 348/448, 446; H04N 7/01

[56] References Cited

U.S. PATENT DOCUMENTS

| | | | |
|---|---|---|---|
| 4,745,458 | 5/1988 | Hirano et al. | 348/446 |
| 5,081,532 | 1/1992 | Rabii | 358/105 |
| 5,185,663 | 2/1993 | Hackett | 348/448 |

FOREIGN PATENT DOCUMENTS

| | | | |
|---|---|---|---|
| 4220662 | 1/1994 | Denmark | H04N 5/14 |
| 0446894 | 9/1991 | European Pat. Off. | H04N 7/12 |
| 3610715 | 1/1987 | Germany | H04N 5/21 |
| 4026511 | 2/1992 | Germany | H04N 7/01 |
| 1425872 | 9/1988 | U.S.S.R. | H04N 5/14 |
| 1690213 | 11/1991 | U.S.S.R. | H04N 5/14 |
| 2073536 | 10/1981 | United Kingdom | H04N 9/535 |
| 2231460 | 11/1990 | United Kingdom | H04N 5/14 |

OTHER PUBLICATIONS

Hentschel, Christian: Theoretischer und subjektiver Vergleich verschiendener Flimmerreduktionsverfahren In: Rundfunktech. Mitteilunger, Jg 31, 1987, H.2, S.75–82.

van Buul, M. C. W.: vin de Polder, L. J.: Standards conversion of a videophone signal with 313 lines into a TV signal with 625 lines. In. Philips Res. Rpts., vol. 29, No. 5, Oct. 1974, S.413–428.

Primary Examiner—James J. Groody
Assistant Examiner—Cheryl Cohen
Attorney, Agent, or Firm—Joseph S. Tripoli; Peter M. Emanuel; Richard G. Coalter

[57] ABSTRACT

Video signals of interlaced form are first converted to progressive scan (non-interlaced) form and then picture elements are generated that lie between the "progressive" picture elements and are interpolated by a vertical one-half (½) line shuffling by application of a vertical averaging. The interpolated picture elements are buffer stored and are read out again at twice the frame repetition rate whereby each second line of the stored interpolated picture elements is emitted delayed in time by 10 milli-seconds. Fields in the format 100 Hz, 2:1 interlace thereby ensue. Advantageously, interpolated picture elements are used in all of the output fields thereby avoiding picture disturbances at the frame rate (25 Hz) of the original video signal. For increasing the subjective vertical sharpness, a vertical peaking may additionally be carried out.

8 Claims, 2 Drawing Sheets

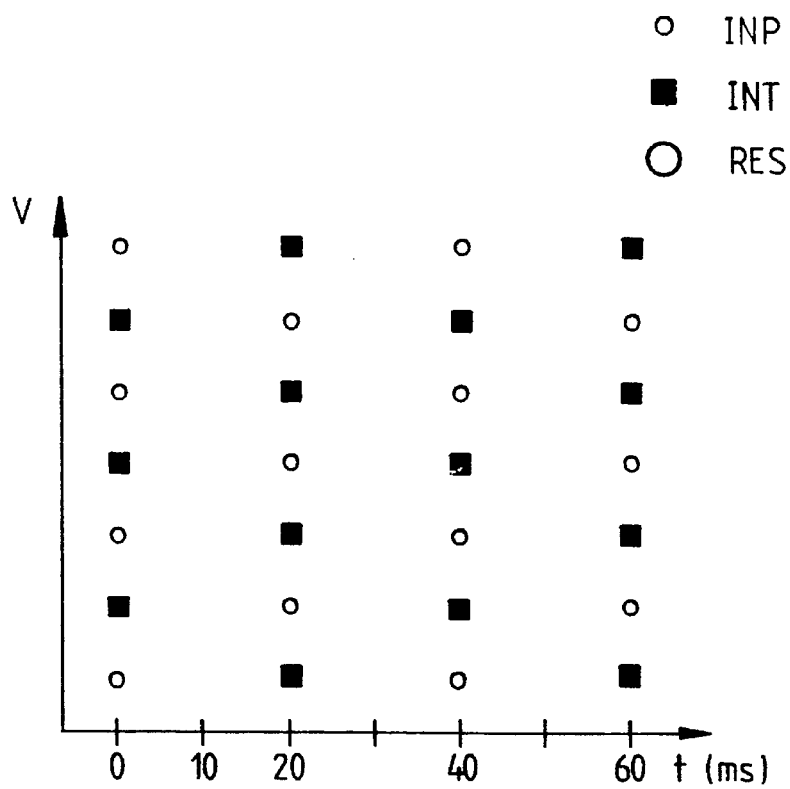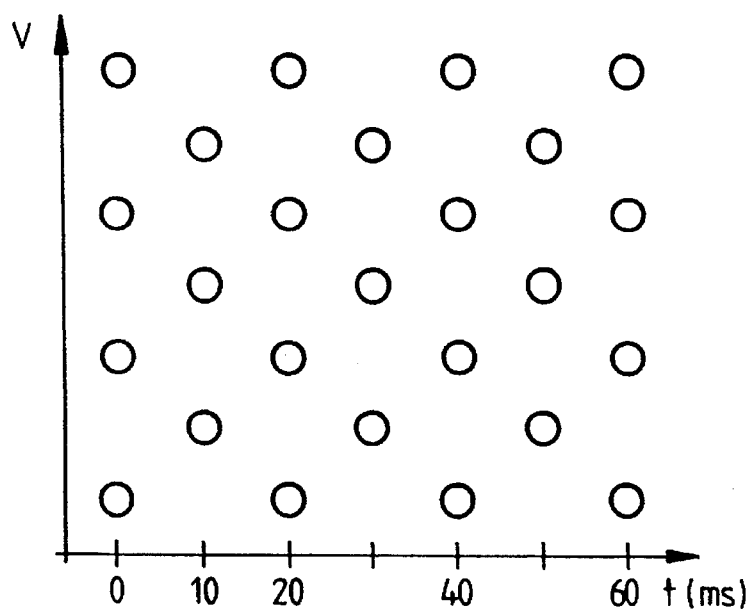

ically adjacent to the picture elements produced by the adder.

METHOD AND APPARATUS FOR CONVERTING A VIDEO INPUT SIGNAL OF PROGRESSIVE SCAN FORM TO AN INTERLACED VIDEO OUTPUT SIGNAL OF DOUBLED FIELD RATE AND EMPLOYING PROGRESSIVE SCAN TO PROGRESSIVE SCAN INTERPOLATION FOR REDUCTION OF VISUAL ARTIFACTS

FIELD OF THE INVENTION

This invention relates to video signal processing systems generally and particularly to systems for doubling the frame repetition rate of a video signal.

BACKGROUND OF THE INVENTION

Doubling the frame rate of a television signal provides a desirable reduction in "flicker" when the signal is displayed. One known method of doubling the frame repetition rate is the "repeat field" method in which each field received is displayed two times. For example, for the received fields A, B and C in a repeat field system, each field would be stored in a memory at a given write clock rate and recovered two times from the memory with a higher read clock rate to provide a display field sequence of A-A-B-B-C-C. Repeating each field once thus doubles the frame rate, repeating twice triples the frame rate, etc.

Another known form of frame rate doubling system employs interpolation to obtain extra fields for display rather than repeating fields. In one such system a second reproduced field (A') is interpolated from the first field that is transmitted (A), a third reproduced field (B') is interpolated from the second field transmitted (B) and a fourth reproduced field (B) is repeated from the second field transmitted (B) to provide a double field rate output signal for display (A-A'-B'-B). However, it has been found that undesirable disturbances may occur in such systems such as line flickering or motion artifacts.

A doubling of the frame repetition rate using a symmetrical double median filtering is achieved in a system described in DE-A-4 220 662. In this system picture elements from lines between the lines of the input fields are calculated using a vertical temporal median filter. Then, progressive fields having double the frame repetition rate are generated from the progressive interpolated fields having e.g., a 50 Hz frame repetition rate with the aid of the formation of a temporal average value. However, it is herein recognized that if these output fields are reproduced with an artificial interlace, then 25 Hz disturbances (e.g., the input signal frame rate) can occur. It is further herein recognized that the problem of such disturbences results, at least in part, because, on each occasion, two successive 100 Hz fields only consist of non-interpolated picture elements.

SUMMARY OF THE INVENTION

The present invention is directed to meeting the need for an improved method for doubling the frame repetition rate of a video signal to provide output frames which are interlaced and which are relatively free of disturbances at the input signal frame rate (e.g., 25 Hz for PAL or SECAM, 29.94 or 30 Hz for NTSC).

In applying the principles of the invention to signal sources of interlaced form it is necessary to provide, initially, a conversion to a progressive scan signal format and, preferably, one in which extra lines for display are obtained by interpolation. Of the various types of progressive scan conversion methods known, one which is presently preferred for purposes of the present invention is described in DE-A 42 11 955 which was filed Apr. 9, 1992, in Germany. A corresponding U.S. application Ser. No. 08/045485 was filed Apr. 9, 1993, by C. Correa and J. Stolte entitled METHOD AND APPARATUS FOR VIDEO SIGNAL INTERPOLATION AND PROGRESSIVE SCAN CONVERSION. In this conversion method, known as "double median up-conversion" or "DMU", the picture elements (INT) of progressive input frames (input INP+interpolated INT) which are to be determined are obtained with the aid of a first temporal median filtering and a second vertical median filtering whereby, interlaced picture elements having the same spatial position that are adjacent in time to the instantaneous picture elements ($P_{2i}$) and an average value from the interlaced picture elements ($P_1$, $P_3$) that are vertically adjacent to the instantaneous picture elements are used for the first median filtering and these vertically adjacent interlaced picture elements and the output signal of the first median filtering are used for the second median filtering.

After the formation of a progressice scan video signal, in accordance with an aspect of the invention, picture elements are generated that lie between the "progressive" picture elements and that are interpolated by a vertical ½ line shuffling (½ line displacement) by means of a vertical interpolation. In the simplest case, this vertical interpolation is a vertical averaging of picture elements. The interpolated picture elements (illustratively, in the format 50 Hz, 1:1 or non-interlaced) are buffer stored and are read output again at twice the frame repetition rate whereby each second line of the stored interpolated picture elements is emitted delayed in time, illustratively, by 10 mSeconds. Fields in the format 100 Hz, 2:1 interlace thereby ensue. Advantageously, interpolated picture elements are used in all of the fields of this output signal whereby the above-mentioned 25 Hz disturbances are avoided. Subjectively, the necessary vertical displacement by half-a-line is not perceived as being disturbing. Advantageously, the artifacts described above are largely suppressed.

Additionally, the interpolated picture elements can be subjected to a vertical peaking (a lifting or boosting of the higher frequencies) before the 100 Hz emission in order to produce a subjectively improved vertical sharpness.

A method for frame rate conversion, in accordance with the invention, for doubling the frame rate of progressive input frames to provide interlaced output fields, comprises the following steps. For each group of picture elements of the instantaneous progressive input frame lying vertically above one another, a picture element that lies vertically between the input lines is interpolated. The interpolated picture elements of each second so-formed line produce a first output field. The interpolated picture elements of the respective other so-formed lines are emitted delayed in time by an amount corresponding to the duration of the field of the interlaced output fields and thus produce a second output field.

The present invention is further directed to meeting the need for apparatus for implementing the method of the invention. Apparatus embodying the invention is provided with a line delay means whose output signals are combined in a following adder with their input signals that comprise picture element values of progressive frames. A divider connected subsequently of the adder, halves picture element values and on each occasion forms the average value of two vertically adjacent picture elements of the instantaneous progressive input frame as picture elements lying vertically between the input lines, which average value is displaced vertically by half a line. A field store means is connected subsequently of the divider for storing the picture element average values and for subsequently recovering the buffer stored picture element average values in the interlaced format at double the frame repetition rate under the control of a control circuit.

BRIEF DESCRIPTION OF THE DRAWING

The foregoing and further features of the invention are illustrated in the accompanying drawing wherein:

FIGS. 1A, 1B, 1C, 1D, and 1E are spatio-temporal interpolation diagrams illustrating certain aspects of field rate doubling in accordance with the invention;

DETAILED DESCRIPTION

Figure 2:
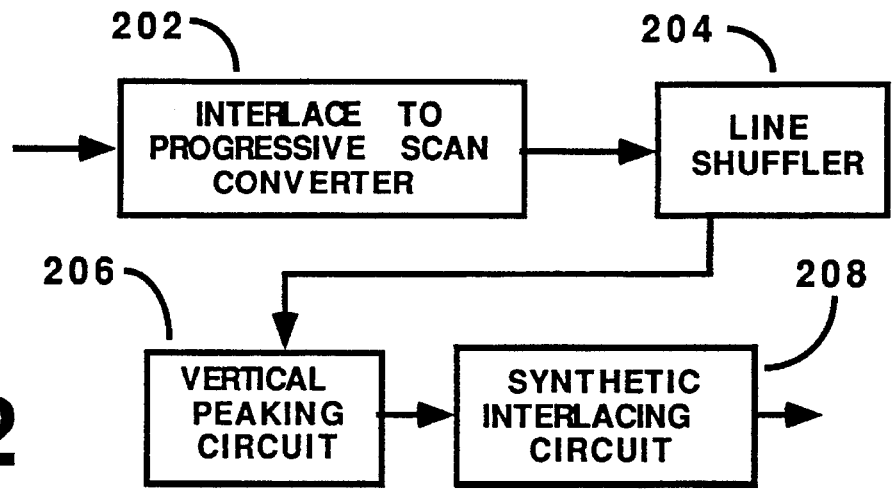
FIG. 2 is a simplified block diagram illustrating the method of field rate doubling in accordance with the invention.

The vertical temporal scanning raster of FIG. 1A illustrates sequential fields comprising original input picture elements (INP, small open circles "o") having a separation in time of, illustratively, 20 mSeconds (50 Hz) and picture elements (INT, black filled rectangles) that are interpolated. This corresponds to frames in a progressive scan format of 50 Hz, 1:1 interlace ratio and represents the starting point for frame rate conversion according to the invention. For interlaced input signals, a conversion to progressive scan as previously described would be performed the preferred conversion technique being, as previously explained, by double median up-conversion. The corresponding output picture elements RES (large open circles "0") having a separation in time of 10 milli-seconds (100 Hz) resulting from the doubling of the frame repetition rate in accordance with the invention are illustrated in FIG. 1B.

FIG. 1C illustrates a step in the conversion process. As shown, the picture element $P_{2i}$ is determined (interpolated) from the picture elements $P_1$ and $P_3$ lying vertically above one another. The picture elements $P_1$, $P_{2i}$ and $P_3$ lead to the progressive scan 50 Hz picture (e.g., FIG. 1A). The picture elements $P_{1A}$ and $P_{2B}$ that are to be interpolated are illustrated in FIG. 1D and given by the following expressions:

$$P_{1A}=(P_1+P_{2i})/2; \text{ and} \quad (1)$$

$$P_{2B}=(P_{2i}+P_3)/2. \quad (2)$$

The picture elements resulting from the interpolation of FIG. 1D (expressions (1) and (2), above) are arranged in FIG. 1E with a half line vertical offset and a 10 milli-second temporal offset (delay). This is in correspondence with a video format having a 100 Hz field rate and a 2:1 interlace factor as shown in FIG. 1B.

FIG. 2 provides further illustration of the conversion. In FIG. 2 50 Hz interlaced input frames are first converted into the format 50 Hz, 1:1 interlace, by an interlace-to-progressive scan converter PRO (202). The interpolated picture elements lying between the input lines are determined by the formation of a vertical average value or by means of a vertical FIR (finite impulse response) transversal filter in a following line shuffler LSH (204). Thereafter, a vertical peaking can be carrier out, as shown, in a peaking circuit VPEA (206) by means of a vertical FIR filter. Finally, in circuit SIL (208), there occurs a synthetic interlacing. The output signals have the format 100 Hz, 2:1 interlace.

Figure 3:
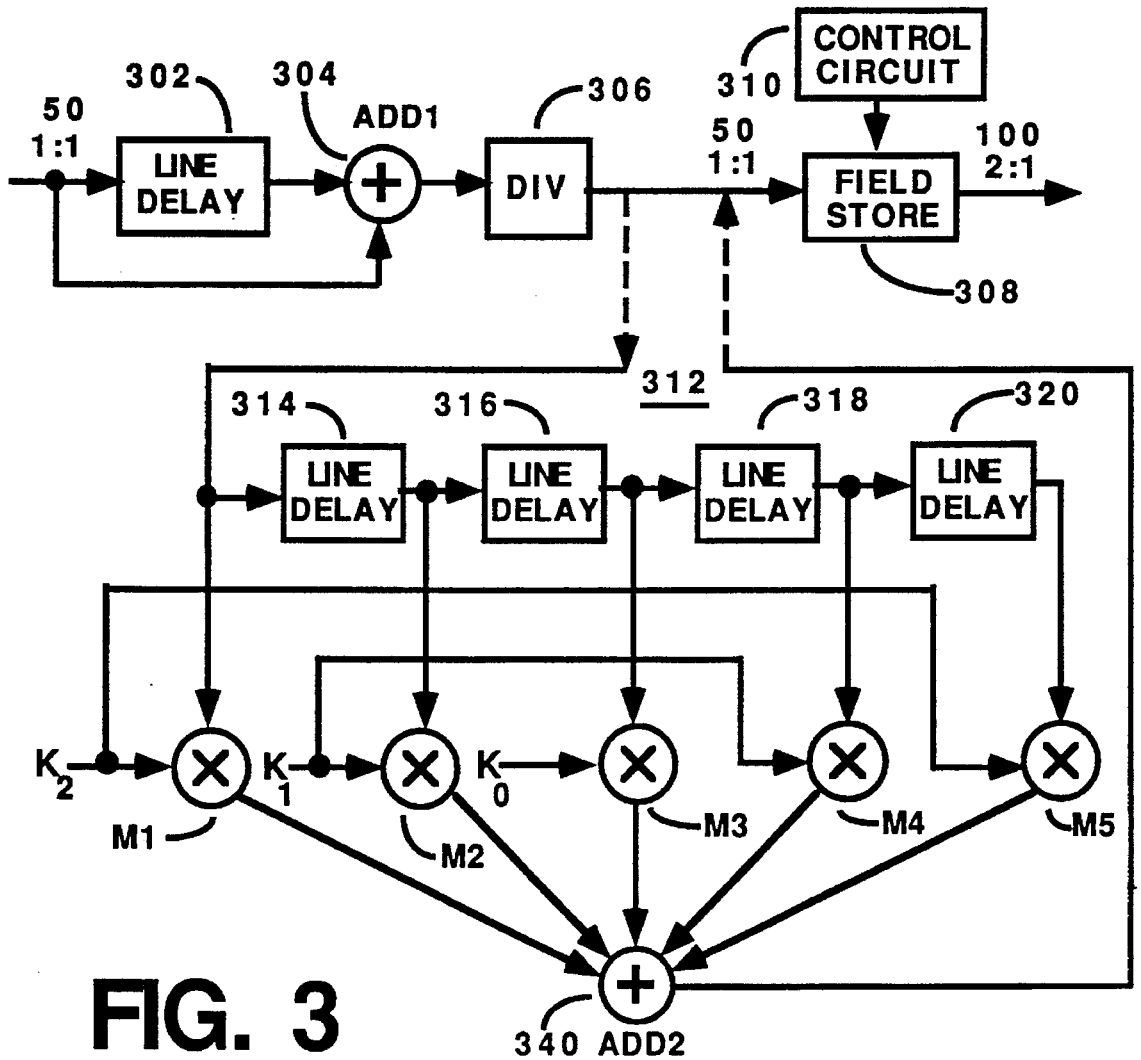
FIG. 3 is a block diagram of apparatus embodying the invention for the doubling of the frame repetition rate.

In FIG. 3, the input picture element values in the format 50 Hz, 1:1 interlace, are supplied to a first line delay unit (LD, 302) and to a first adder (ADD1, 304) in which the output signal from LD 302 is combined with the input signal (50, 1:1) supplied to LD 302 from a suitable source of progressive scan input signals of 50 Hz field rate (e.g., 202 of FIG. 2). The output of ADD1 is connected to the input of a divider (DIV, 306) which brings about a division by two. For digital systems, this division by two may be provided by means of a shift operation. The elements 302, 304, 306 provide the "line shuffle" (interpolation) function of unit 204 in FIG. 2.

The output signals from DIV 306 are supplied to a field store or field delay unit (FD, 308) which is controlled by a control circuit (CON, 310). The control circuit CON causes the respective lines 1, 2, . . . , n in the format 50 Hz, 1:1 interlace to be successively read into FD 308 and the lines 1, 3, . . . , n-1 and the lines 2, 4, . . . , n to be read out in the format 100 Hz, 2:1 interlace. Read-in after the new line 2 is only effected after the old line 2 has been emitted. Conventional memories, controlled as described may be used for this purpose. Memories providing essentially concurrent read/write operations are known and are commonly called "dual port" memories.

A peaking filter 312 having e.g. 5 coefficients ($k_2$, $k_1$, $k_0$, $k_1$, $k_2$) can be optionally inserted between DIV 306 and the field delay unit FD 308 as indicated in the drawing by the dashed input/output connecting lines. For this, the output from DIV 306 is supplied serially to four line delay units 314–320 labeled LD1, LD2, LD3 and LD4, respectively. The outputs of these line delay units and the input of LD1 are respectively weighted with the relevant coefficients by corresponding multipliers labeled M1, M2, M3, M4 and M5, respectively. The output signals of these multipliers are added in a second adder 340 ("ADD2") thereby forming a finite impulse response (FIR) transversal peaking filter. The coefficients (k, above) may be selected to provide a desired degree of high frequency peaking of the filtered signal. After peaking, the resultant signal (output of ADD2) is supplied to the field store FD 308.

The principles of the invention are of general utility and may be applied to the processing of video signals of various standard formats (e.g., NTSC, PAL, SECAM) and to video signals of non-standard formats (e.g., special video production standards or developing high definition television standards). Various changes may be made to the embodiments of the invention herein described and shown. For example, the number of lines in the frames can be, illustratively, 525, 625, 1050, 1125 or 1250 whereby the storage time of the field store FD 308 is appropriately matched. The invention can likewise be utilized for input frame repetition rates of 59.94 Hz (NTSC color standard) or 60 Hz (NTSC monochrome standard).

What is claimed is:

1. A method for doubling the frame repetition rate of progressive input frames and providing interlaced output fields at double the input progressive frame rate, comprising the steps of:

providing progressive input frames at a given progressive frame rate;

from each group of picture elements (P1, P2i or P2i, P3) of the instantaneous progressive input frame that lie vertically above one another, a picture element (P1A or P2B) lying vertically between the input lines is interpolated (LSH);

the interpolated picture elements (P1A) of every other so-formed line produce a first output field; and the interpolated picture elements (P2B) of the in-between so-formed lines are emitted delayed in time by an amount corresponding to the duration of the field of the interlaced output fields and thus produce a second output field (P2B) interlaced with said first output field at a field rate double said given progressive frame rate.

2. A method according to claim 1 wherein:

for interlaced source signals, the picture elements of the progressive input frames which are to be determined are obtained with the aid of a first temporal median filtering and a second vertical median filtering whereby, interlaced picture elements having the same spatial position that are adjacent in time to the instantaneous picture element and an average value from the interlaced picture elements that are vertically adjacent to the instantaneous picture element are used for the first median filtering and these vertically adjacent interlaced picture elements and the output signal of the first median filtering are used for the second median filtering.

3. A method in accordance with claim 1 wherein the interpolated picture elements are filtered with a vertical peaking filter before said emission.

4. A method in accordance with claim 2 wherein the interpolated picture elements are filtered with a vertical peaking filter before said emission.

5. Apparatus for doubling the frame repetition rate of progressive input frames and providing interlaced output fields at double the input progressive frame rate, comprising:

an input for providing progressive frames of a given frame rate;

a line delay means (302) whose output signals are combined in a following adder (306) with their input signals that comprise picture elements of said progressive frames;

a divider (306) connected subsequently of said adder which halves picture element values and on each occasion forms the average value of two vertically adjacent picture elements (P1,P2i or P2i, P3) of the instantaneous progressive input frame as picture elements (P1A or P2B) lying vertically between the input lines, which average value is displaced vertically by half a line; and field store means (308) connected subsequently of the divider for storing the picture element average values which reads out the buffer stored picture element average values in the interlaced format at a field rate double said given frame rate of said progressive frames under the control of a control circuit (310).

6. Apparatus as recited in claim 5 further comprising a progressive scan converter for receiving an interlaced video input signal and for supplying said progressive input frames to said line delay means, said converter including means for applying vertical and temporal median filtering to said input signal in forming said progressive frames.

7. Apparatus as recited in claim 5 further comprising a vertical peaking filter interposed in a circuit path between said divider and said field store means.

8. Apparatus as recited in claim 6 further comprising a vertical peaking filter interposed in a circuit path between said divider and said field store means.

* * * * *